United States Patent
Arnedo Vera et al.

(10) Patent No.: US 9,261,316 B2
(45) Date of Patent: Feb. 16, 2016

(54) METHOD FOR THE MANUFACTURE OF A BARREL FOR COMPRESSED AIR OR $CO_2$ RIFLES AND BARREL FOR COMPRESSED AIR OR $CO_2$ RIFLES OBTAINED

(71) Applicant: GAMO OUTDOOR, S.L., Sant Boi de Llobregat (Barcelona) (ES)

(72) Inventors: Julian Arnedo Vera, Sant Boi de Llobregat (ES); Victor Tresserras Torre, Sant Boi de Llobregat (ES)

(73) Assignee: GAMO OUTDOOR, S.L., Barcelona (ES)

( * ) Notice: Subject to any disclaimer, the term of this patent is extended or adjusted under 35 U.S.C. 154(b) by 0 days.

(21) Appl. No.: 14/371,660

(22) PCT Filed: Dec. 21, 2012

(86) PCT No.: PCT/ES2012/070900
§ 371 (c)(1),
(2) Date: Jul. 10, 2014

(87) PCT Pub. No.: WO2013/104811
PCT Pub. Date: Jul. 18, 2013

(65) Prior Publication Data
US 2015/0000645 A1  Jan. 1, 2015

(30) Foreign Application Priority Data

Jan. 13, 2012  (ES) .................................. 201230052

(51) Int. Cl.
*F41A 21/00* (2006.01)
*F41A 21/02* (2006.01)
(Continued)

(52) U.S. Cl.
CPC ............ *F41A 21/02* (2013.01); *B29C 45/14065* (2013.01); *B29C 45/14336* (2013.01);
(Continued)

(58) Field of Classification Search
CPC .......... F41B 21/00; F41B 21/02; F41B 21/04; F41B 21/30; F41B 11/00
USPC ........... 42/76.01, 76.02, 76.1; 89/14.05, 14.7, 89/14.4, 15, 16; 124/83, 85
See application file for complete search history.

(56) References Cited

U.S. PATENT DOCUMENTS

| 916,885 | A |   | 3/1909 | Maxim |
| 1,017,003 | A | * | 2/1912 | Kenney ................... F41A 21/30 181/223 |

(Continued)

FOREIGN PATENT DOCUMENTS

| AT | 153280 | 4/1938 |
| DE | 1553966 | 7/1971 |

(Continued)

OTHER PUBLICATIONS

International search report dated May 23 in corresponding PCT Application No. PCT/ES2012/070900 filed Dec. 21, 2012. U.S. Office Action for U.S. Appl. No. 14/844,232 mailed Oct. 8, 2015.

(Continued)

*Primary Examiner* — Alexander Niconovich
(74) *Attorney, Agent, or Firm* — RatnerPrestia

(57) ABSTRACT

Method for the manufacture of a barrel for compressed air or $CO_2$ rifles and a barrel for compressed air or $CO_2$ rifles obtained
It comprises a hollow tube (1), through the interior of which circulates a pellet, with an entrance end (14) and an exit end (15), characterized in that it comprises a first step in which tube (1) is introduced into a molding machine and fixing elements (50) or supports are introduced, fixing tube (1) and leaving it overhanging, centered, stable, inside the molding machine and a second step in which tube (1) is over-molded, with the exception of the tube entrance end (14), giving it the desired form.

23 Claims, 3 Drawing Sheets

(51) Int. Cl.
*F41B 11/00* (2013.01)
*F41A 21/30* (2006.01)
*F41A 21/20* (2006.01)
*B29C 45/14* (2006.01)
*B29K 705/00* (2006.01)
*B29L 31/00* (2006.01)

(52) U.S. Cl.
CPC .............. *F41A21/00* (2013.01); *F41A 21/20* (2013.01); *F41A 21/30* (2013.01); *F41B 11/00* (2013.01); *B29K 2705/00* (2013.01); *B29L 2031/777* (2013.01)

(56) References Cited

U.S. PATENT DOCUMENTS

| | | | | |
|---|---|---|---|---|
| 1,111,202 | A * | 9/1914 | Westfall | F41A 21/30 181/223 |
| 1,173,687 | A | 2/1916 | Thompson | |
| 1,296,193 | A | 3/1919 | Johnston | |
| 1,406,404 | A | 2/1922 | McCrudden | |
| 1,605,864 | A | 11/1926 | Steinegger | |
| 1,736,319 | A | 11/1929 | Maxim | |
| 1,773,260 | A | 8/1930 | Cutts | |
| 1,939,700 | A | 12/1933 | Hofstetter | |
| 2,101,063 | A | 12/1937 | Green | |
| 2,101,850 | A | 12/1937 | Green | |
| 2,110,165 | A | 3/1938 | Moore | |
| 2,112,831 | A | 4/1938 | Cutts, Jr. | |
| 2,150,161 | A | 3/1939 | Green | |
| 2,165,457 | A | 7/1939 | Cutts, Jr. | |
| 2,365,388 | A | 12/1944 | Browning | |
| 2,448,382 | A | 8/1948 | Mason | |
| 2,451,514 | A | 10/1948 | Sieg | |
| 2,467,372 | A | 4/1949 | Permentier | |
| 2,503,491 | A | 4/1950 | Janz | |
| 2,662,326 | A | 12/1953 | Powell | |
| 2,668,479 | A | 2/1954 | Batten | |
| 2,816,484 | A | 12/1957 | Grages | |
| 2,845,741 | A * | 8/1958 | Day | F41A 21/02 42/76.01 |
| 2,847,786 | A * | 8/1958 | Day | F41A 21/02 138/DIG. 2 |
| 2,894,347 | A | 7/1959 | Woodcock | |
| 2,981,155 | A * | 4/1961 | Parlanti | B22D 19/08 42/76.02 |
| 3,118,243 | A * | 1/1964 | Manshel | F41A 21/02 42/76.02 |
| 3,228,298 | A * | 1/1966 | Grandy | F41A 21/02 42/76.02 |
| 3,299,558 | A * | 1/1967 | Karl | F41A 21/02 42/124 |
| 3,385,164 | A | 5/1968 | Walther | |
| 3,500,955 | A | 3/1970 | Werbell | |
| 3,517,585 | A * | 6/1970 | Slade | F41A 21/02 42/76.01 |
| 3,665,804 | A | 5/1972 | Rohr | |
| 3,667,570 | A | 6/1972 | WerBell, III | |
| 3,713,362 | A | 1/1973 | Charron | |
| 4,213,375 | A | 7/1980 | Pedler | |
| 4,366,625 | A * | 1/1983 | Gehmann | F41G 1/04 42/117 |
| 4,576,083 | A | 3/1986 | Seberger, Jr. | |
| 4,584,924 | A | 4/1986 | Taguchi | |
| 4,685,236 | A * | 8/1987 | May | F41A 21/02 42/76.02 |
| 4,769,938 | A * | 9/1988 | Chesnut | F41A 21/484 42/124 |
| 4,989,359 | A * | 2/1991 | Kinkner | F41A 21/06 42/77 |
| 5,212,328 | A * | 5/1993 | Petrovich | F41A 21/04 42/76.02 |
| 5,315,914 | A | 5/1994 | Schumacher | |
| 5,355,765 | A | 10/1994 | Rogers | |
| 5,367,940 | A | 11/1994 | Taylor | |
| 5,600,912 | A * | 2/1997 | Smith | F41A 21/02 42/76.01 |
| 5,753,846 | A | 5/1998 | Koon | |
| 5,798,474 | A | 8/1998 | Rogers | |
| 6,079,311 | A | 6/2000 | O'Quinn | |
| 6,189,431 | B1 * | 2/2001 | Danner | F41A 21/02 42/76.02 |
| 6,197,437 | B1 * | 3/2001 | Bielec | B22D 17/2023 148/425 |
| 6,412,389 | B2 | 7/2002 | Fluhr | |
| 6,575,074 | B1 | 6/2003 | Gaddini | |
| 6,594,936 | B1 * | 7/2003 | Sniezak | F41A 21/04 42/76.02 |
| 6,701,820 | B2 | 3/2004 | Fluhr | |
| 6,758,004 | B2 * | 7/2004 | Huston | F41A 21/02 29/33 D |
| 6,889,464 | B2 * | 5/2005 | Degerness | F41A 21/02 42/76.01 |
| 7,073,426 | B1 | 7/2006 | White | |
| 7,707,763 | B2 | 5/2010 | Brixius | |
| 7,802,393 | B2 * | 9/2010 | Judson | F41A 21/02 264/102 |
| 7,921,590 | B2 * | 4/2011 | Briggs | F41A 21/04 42/76.02 |
| 7,934,332 | B2 * | 5/2011 | Briggs | F41A 21/02 29/520 |
| 8,234,808 | B2 * | 8/2012 | Lewis | F41A 3/26 42/71.01 |
| 8,245,618 | B2 | 8/2012 | Emde | |
| 8,261,651 | B2 * | 9/2012 | Casas Salva | F41A 21/02 181/223 |
| 8,312,663 | B2 | 11/2012 | Johnson | |
| 8,353,124 | B1 * | 1/2013 | Zukowski | F41A 21/02 42/76.02 |
| 8,474,361 | B2 * | 7/2013 | Brittingham | F41A 21/30 42/76.1 |
| 8,561,337 | B2 * | 10/2013 | Lewis | F41A 3/26 42/73 |
| 8,595,971 | B2 * | 12/2013 | Johnson | F41A 13/12 42/76.01 |
| 8,713,833 | B2 * | 5/2014 | Lewis | F41A 3/26 42/16 |
| 8,776,425 | B2 * | 7/2014 | Pelin | B21H 1/18 42/76.1 |
| 8,857,307 | B2 * | 10/2014 | Tresserras Torre | F41A 21/02 89/14.05 |
| 8,863,429 | B2 * | 10/2014 | Pelin | B21H 1/18 42/76.1 |
| 8,881,862 | B1 | 11/2014 | Messer, Jr. | |
| 9,109,851 | B2 * | 8/2015 | Salva | F41A 21/02 |
| 9,157,692 | B2 * | 10/2015 | Salva | F41A 21/02 |
| 2003/0093935 | A1 * | 5/2003 | Huston | F41A 21/02 42/76.02 |
| 2005/0262997 | A1 | 12/2005 | Brixius | |
| 2008/0251060 | A1 * | 10/2008 | Thurber | F41A 21/02 124/83 |
| 2010/0058921 | A1 | 3/2010 | Brixius | |
| 2010/0058922 | A1 * | 3/2010 | Casas Salva | F41A 21/02 89/14.4 |
| 2010/0126334 | A1 | 5/2010 | Shults | |
| 2010/0224053 | A1 | 9/2010 | Brixius | |
| 2012/0272818 | A1 | 11/2012 | Dueck | |
| 2012/0291614 | A1 | 11/2012 | Koumbis | |
| 2013/0180149 | A1 * | 7/2013 | Casas Salva | F41A 21/02 42/76.1 |
| 2014/0007481 | A1 * | 1/2014 | Tresserras Torre | F41A 21/02 42/76.1 |
| 2015/0000645 | A1 * | 1/2015 | Arnedo Vera | B29C 45/14065 124/85 |
| 2015/0159971 | A1 * | 6/2015 | Salva | F41A 21/02 89/14.4 |

FOREIGN PATENT DOCUMENTS

| DE | 2825899 | 3/1979 |
| DE | 3035384 A1 | 5/1982 |
| DE | 3700398 | 7/1987 |

(56) References Cited

FOREIGN PATENT DOCUMENTS

| | | |
|---|---|---|
| DE | 4231183 | 3/1994 |
| DE | 69506416 | 12/1998 |
| DE | 19935929 | 2/2001 |
| DE | 10001374 | 6/2001 |
| EP | 0772758 | 12/1998 |
| EP | 0961096 | 12/1999 |
| EP | 1117970 | 1/2004 |
| EP | 1247057 | 3/2004 |
| EP | 2112452 A1 | 10/2009 |
| GB | 2104197 | 3/1983 |
| GB | 2193562 | 2/1988 |
| WO | 9407103 | 3/1994 |
| WO | 9603612 | 2/1996 |
| WO | WO 00/71960 A2 | 11/2000 |

OTHER PUBLICATIONS

Entire patent prosecution history of U.S. Appl. No. 13/564,868, filed Aug. 2, 2012, entitled, "Process of Manufacturing a Rifle to Have an Integral Sound Suppressor."
Entire patent prosecution history of U.S. Appl. No. 14/259,809, filed Apr. 23, 2014, entitled, "Rifle With Noise Damper."
Hafner, D, Nullity Action, Oct. 8, 2012.
International Preliminary Report on Patentability for International Application No. PCT/IB2007/054413 dated Apr. 23, 2009.
Notice of Allowance for U.S. Appl. No. 14/259,809 dated Jul. 6, 2015.
U.S. Office Action for U.S. Appl. No. 13/564,868 dated Sep. 17, 2014.
Written Opinion of the International Searching Authority for International Application No. PCT/IB2007/054413 dated Mar. 28, 2008.

* cited by examiner

METHOD FOR THE MANUFACTURE OF A BARREL FOR COMPRESSED AIR OR $CO_2$ RIFLES AND BARREL FOR COMPRESSED AIR OR $CO_2$ RIFLES OBTAINED

CROSS REFERENCE TO RELATED APPLICATIONS

This application is a 371 application of International Application No. PCT/ES2012070900, filed Dec. 21, 2012, which claims priority to Spanish Patent Application 201230052, filed Jan. 13, 2012, all of which are incorporated by reference in its entirety herein.

DESCRIPTION

Method for the manufacture of a barrel for compressed air or $CO_2$ rifles and the barrel for compressed air or $CO_2$ rifles obtained of the type that comprises a hollow tube, through the interior of which circulates a pellet, with an entrance end and an exit end, characterised in that it comprises a first step in which the tube is introduced into a moulding machine and fixing elements or supports are introduced, fixing the tube and leaving it overhanging, centred, stable, inside the moulding machine and a second step in which the tube is over-moulded, with the exception of the tube entrance end, giving it the desired form.

BACKGROUND OF THE INVENTION

Over-moulded or over-injected rifles are known in the state of the art belonging to the applicant firm. Specifically, those relating to over-moulded and/or over-injected sound reducers on the sporting rifle barrel should be pointed out.

Thus, European Patent 2112452 is known, in the name of the applicant firm, filed in 2007, which refers to a firearm or compressed air arm, with a sound reducer, of the type comprising a firing mechanism, a barrel, a chamber, with said firearm or compressed air arm comprising an over-moulded or over-injected sound reducer on the mentioned barrel, so that the barrel and the sound reducer form a single part. PCT/ES2011/070024 is also known, belonging to the same applicant firm and with the same inventors, filed on $17^{th}$ of January 2011 for a "Method for manufacturing a bull barrel equipped with a sound reducer and sound reducer-equipped "bull barrel" obtained", that comprises a barrel with an entrance end and an exit end, which method is characterised in that it comprises the following steps: a first step in which a tube, having two ends, a first and a second, having an inner diameter greater than the outer diameter of the barrel, is fixed to a wedge by its first end, a second step in which a muzzle that terminates in a hood is fixed to the second end of the tube, with said muzzle comprising at least one lateral aperture and at least a first hoop that fits into the tube sealing the second tube end with stops that define channels in the hood, which connect the outside with the muzzle interior, being the mentioned stops the end of the referred tube, a third step in which the barrel is fixed to the muzzle and the wedge, defining a space or cavity between the tube and the barrel and a fourth step in which the configuration of the third step is introduced into a moulding machine that over-moulds it with the exception of the barrel entrance end, giving it the desired form, with said over-moulding penetrating inside the tube by the channels up to the referred first hoop.

DISCLOSURE OF THE INVENTION

This application is framed within the manufacturing sector for sporting rifle barrels.

The closest document is PCT/ES2011/070024. This document describes a method for the manufacture of a "bull barrel" model. It employs the over-moulding of the sound reducer, fixing the cover of the sound reducer to the actual sound reducer and to the barrel by means of the same over-moulding fluid, so that said sound reducer cannot be dismounted.

Although, the previously mentioned method is very useful when employing sound reducers, the inventors wanted to apply over-moulding to the hollow tube that forms part of the barrel. The problem that is encountered when over-moulding said tube, is that the pressure exerted by the fluid on the tube walls destroys its centring, which means the over-moulded wall thickness is not uniform along the full barrel length, so that radial forces are not balanced and thus cause problems in the final obtained product, for example, bent barrels.

At the same time, if it is not desired to install a sound reducer, but get a "bull barrel" model, the teachings of said document cannot be employed to obtain said a barrel either.

The inventors have resolved the tube centring problem inside the moulding machine by means of fixing elements that abut the metal core of the tube or profile, maintaining the same overhanging and well-centred inside of the mould, thus achieving uniform over-moulding thicknesses along its full length.

In this way, when the material or fluid enters, the tube sag zone is reduced because the support points produced via the fixing elements or supports prevent this.

Furthermore, high pressures are also produced with the entry of the material or fluid that derive from the material or fluid injection, which is counter-balanced by the fixing elements or supports that centre the tube. Thus, when the material or fluid enters, it produces an injection pressure that, because the tube is centred, the fixing elements or supports that provide stability enable the assembly to be compensated and balanced and, at the same time, the previously described deformation is avoided.

At the same time, if a "bull barrel" model is to be achieved, the installation of a rigid profile can be planned to contain the tube, with the desired exterior form and which is going to be the over-moulded part and with the respective fixing elements that can fix the tube with the profile in a centred position.

One objective of this invention is a method for the manufacture of a barrel for compressed air or $CO_2$ rifles, that comprises: a hollow tube, through the interior of which circulates a pellet, with an entrance end and an exit end, or a hollow tube, through the interior of which circulates a pellet, with an entrance end and an exit end and provided with a profile, that for its inner part surrounds externally said tube, with which it is in contact, the method being characterised in that it comprises a first step in which the tube or tube (1) with the profile is introduced into a moulding machine and fixing elements or supports are introduced, fixing the tube or the profile and leaving it overhanging, centred, stable, inside the moulding machine and a second step in which the tube or profile is over-moulded, with the exception of the tube entrance end, giving it the desired shape.

An additional objective of this invention is a barrel for compressed air or $CO_2$ rifles obtained in accordance with the previous method, of the type that comprises a hollow tube, through the interior of which circulates a pellet, with an entrance end and an exit end, or a hollow tube, through the interior of which circulates a pellet, with an entrance end and an exit end and with a profile that which for its inner part surrounds externally said tube with which it is in contact characterised in that it comprises fixing elements on a over-moulding machine, with said tube or profile being uniformly over-moulded, with the exception of the tube entrance end, giving the over-mould the desired form and orifices being defined by said fixing elements.

BRIEF DESCRIPTION OF THE DRAWINGS

In order to facilitate the description, two sheets of drawings are enclosed in which a practical embodiment is represented, which is only cited as an non limiting example of the scope of the present invention.

SPECIFIC EXEMPLARY EMBODIMENT OF THIS INVENTION

Figure 1:
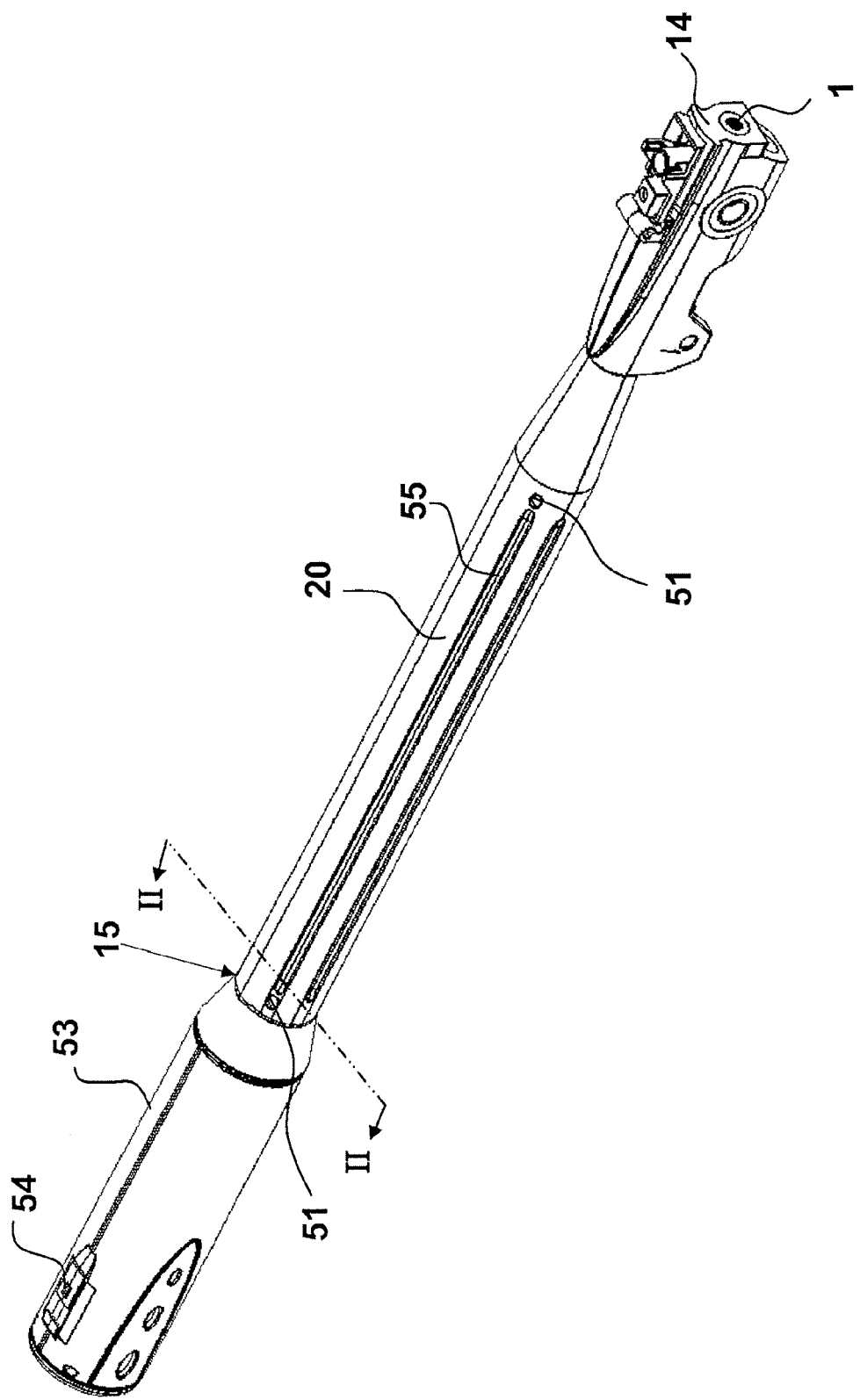
FIG. 1 is a perspective view of the object of this invention.

Thus, FIG. 1 illustrates a tube 1 with its entrance end 14 and its exit end 15, over-mould 20, orifices 51, grooves 55, sound reducer 53 and clips 54 for installing a sight.

Figure 2:
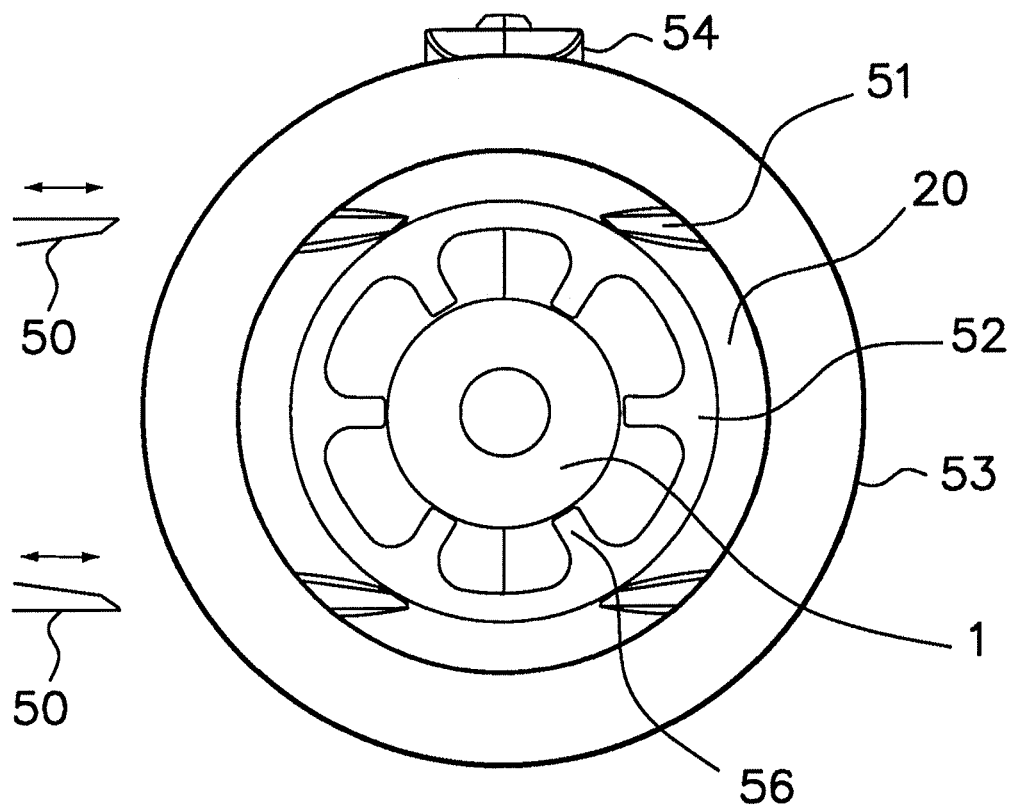
FIG. 2 is a section along line II-II, showing the position of the fixing elements inside the moulding machine

FIG. 2 represents over-mould 20 with orifices 51, fixing elements or supports 50, profile 52 with its longitudinal supports 56, barrel 1, sound reducer 53 and clips 54 for a sight.

Figure 3:
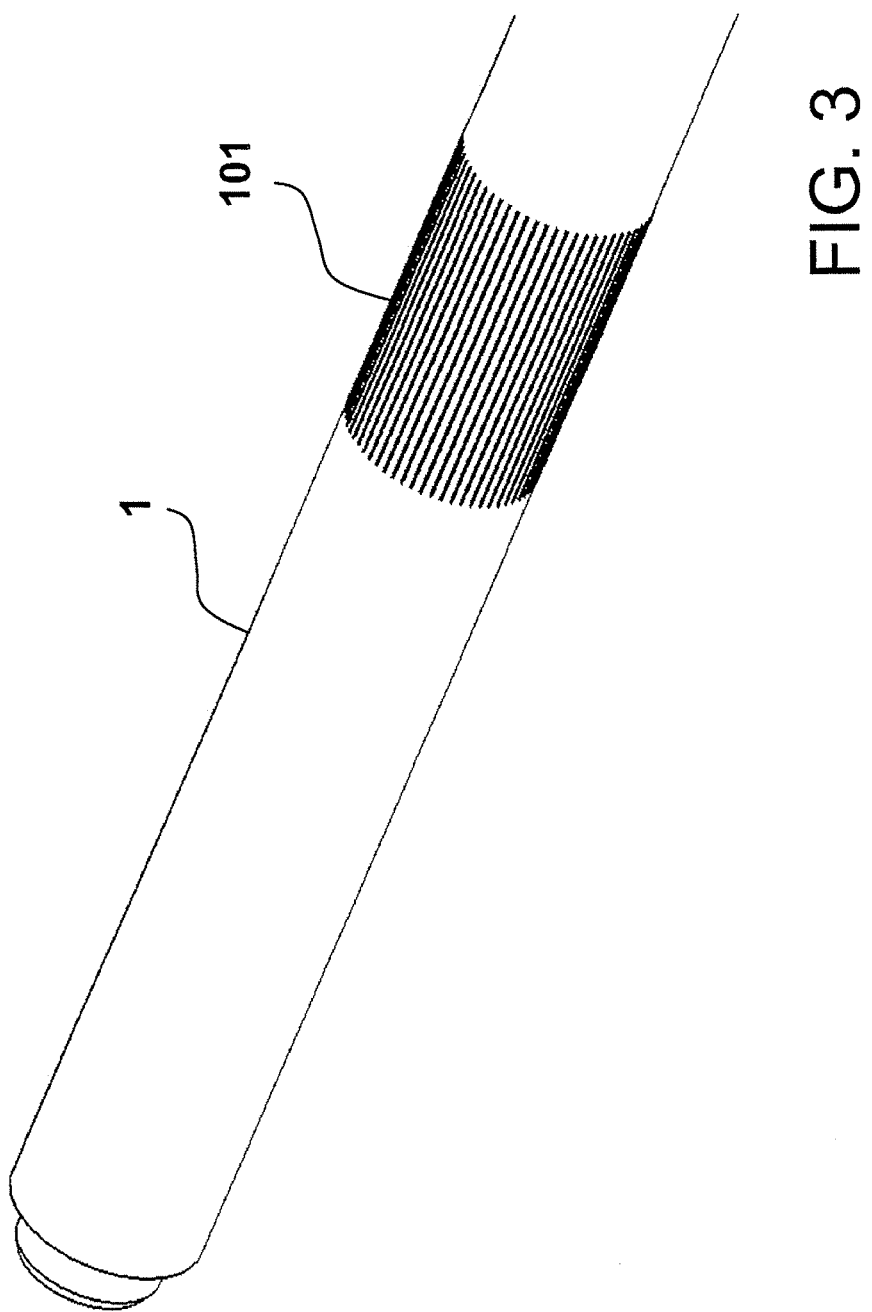
FIG. 3 is a partial perspective view of the tube.

Lastly, FIG. 3 shows a tube 1, with grooves 101.

Thus, in an exemplary embodiment, this barrel is manufactured as follows.

To facilitate understanding, the assembly has been defined as barrel and the element through which the pellet circulates as the tube once it has been fired, although it can also be generally understood as the barrel. In order to avoid confusion when defining, the assembly is designated the barrel and where the pellet circulates is named the tube.

In a first step, hollow tube 1 is inserted, through the interior of which circulate the pellets when fired, in a moulding machine (not fully illustrated) and fixing elements 50 or supports are introduced, fixing tube 1 leaving it overhanging, centred and stable inside the moulding machine.

As previously indicated, this step determines that the tube (1) is moulded in a uniform manner. At the same time, the tube 1 sag zone, produced by the vibrations and pressures of the over-moulding fluid or material, is reduced or eliminated, due to the increase of the support points for tube 1 during over-moulding.

It also enables withstand the high pressures of the injection of the material or fluid which is overmoulded, compensating and preventing deformation.

In the second step, tube 1 is over-moulded with the exception of tube entrance end 14, giving it the desired form, for example, adding longitudinal grooves 55, as shown in FIG. 1, or even the manufacturer's trademark or name.

The barrel is ready once it has cooled.

If a "bull barrel" model is desired, prior to introducing tube 1 into the moulding machine, a profile 52 can be installed on tube 1, the interior part of which is exteriorly wrapped around tube 1 and which is fixed and centred by its exterior part by fixing elements 50 prior to receiving the overmoulding 20. This profile is employed when the manufacturer wishes to produce a "bull barrel" model, in which the barrel has a considerably larger diameter than tube 1.

Thus, in addition to enlarging the exterior barrel diameter, said profile also enables the deformation section to be smaller because profile 52 bears along the length of tube 1, providing great rigidity to the finished barrel.

Optionally, profile 52 may include the employment or it may be comprised of a series of hoops (not illustrated), successively arranged that, prior to inserting tube 1 into the moulding machine, support an additional tube with inside diameter equal to the outside diameter of the hoops or which fits into them and the outside diameter is that required to produce a "bull barrel" model. Said hoops are successively arranged and their interior part is exteriorly wrapped around tube 1 at least partially, and its exterior part is in contact with the previously cited additional tube and all of which is subsequently over-moulded.

Optionally, referred tube 1 can be configured so that it comprises anti-slip grooves 101, just as shown in FIG. 3.

Said anti-slip grooves 101 are in contact with profile 52.

Said grooves 101 may also be in contact with longitudinal support ribs 56 belonging to profile 52, which immobilises them.

In this way, when profile 52 is over-moulded, said grooves 101 prevent profile 52 from moving or rotating as a consequence of the entry force of the over-moulding fluid, because grooves 101 tightly grip profile 52 and maintain it immobile and straight.

So, profile 52 or its variants, such as the referred longitudinal support ribs 56 or even the hoops described above, are prevented from rotating or screwing in when the fluid flows over fixing element 50, thus preventing longitudinal supports 56 from deforming.

Depending on tube 1 size and over-mould 20 thickness, it can be arranged so that the material or fluid enters by one of the ends, either entrance end 14 or exit end 15, or by both at the same time. In both cases, correct centring of tube 1 prevents pressures that decompensate the tube and ruin the over-moulding operation.

Just as shown in the figures, tube 1 can also be over-moulded with sound reducer 53, which is permanently fixed to exit end 15 of tube 1. This alternative is very useful for countries, such as the USA, where sound reducers must not be capable of being separated from barrel tube 1. In this case, it will have to be broken to separate it, leaving the rifle unusable.

The barrel for compressed air or $CO_2$ rifles resulting from the previous method comprise hollow tube 1, through the interior of which the pellet circulates when the rifle has been fired. The barrel comprises entrance end 14, where the pellet enters when fired and exit end 15, where the pellet exits tube 1 after travelling along inside tube 1.

Sound reducer 53 is fixed to exit end 15 of the tube.

The tube is held fixed by means of fixing elements 50. As previously described, the function of fixing elements 50 or supports is to maintain tube 1 centred, to compensate for the over-moulding forces and pressures.

Tube 1 is uniformly over-moulded, with the exception of tube entrance end 14, giving it the desired form. Similarly, when over-moulding is completed, holes 51 are configured in the over-moulded part of the barrel due to fixing elements 50.

There is the option in which tube 1 is wrapped by profile 52 (FIG. 2), the interior part of which is exteriorly wrapped around tube 1 and which is over-moulded by its exterior part. The profile may be made of extruded aluminium. This provides the advantages of being both very light and rigid, which is essential in a rifle because of the forces and pressures to which the barrel is subjected when the pellet is fired.

This profile 52 is configured so that it comprises longitudinal support ribs 56 on tube 1. This enables the deformation section to be reduced because it is support along the length of tube 1.

Optionally, profile 52 may include the employment or consist of a series of hoops, successively arranged that exteriorly fit into an additional tube with inside diameter equal to the outside diameter of the hoops and the outside diameter is required to produce a "bull barrel" model. Moreover, the interior part of said hoops is exteriorly wrapped around tube 1 at least partially. All of which is subsequently over-moulded.

Optionally, referred tube 1 can be configured so that it comprises anti-slip grooves 101, just as shown in FIG. 3.

Said anti-slip grooves 101 are in contact with profile 52.

Said anti-slip grooves 101 may also be in contact with longitudinal support ribs 56 belonging to profile 52, to which immobilises.

In this way, when profile 52 is over-moulded, said grooves 101 prevent profile 52 from moving or rotating as a consequence of the entry force of the over-moulding fluid, because grooves 101 tightly grip profile 52 and maintain it immobile and straight.

So, profile 52 or its variants, such as the referred longitudinal support ribs 56 or even the hoops described above, are prevented from rotating or turning when the fluid flows over fixing elements 50, thus preventing longitudinal ribs 56 from slipping.

The over-moulding fluid can enter by one of the ends or by both.

The barrel can be configured with sound reducer 53 that is over-moulded with tube 1, with exit end 15, so that the referred sound reducer 53 is permanently fixed to exit end 15 of tube 1.

Similarly, over-mould 20 may cover at least part of profile 52 and part of tube 1, in other words, in the case of a "bull barrel" model on which profile 52 is over-moulded and a continuation part towards the butt, that is tube 1.

Optionally, the over-moulding of elements 54 can be incorporated for the installation of sights.

This invention patent describes a method for manufacturing a barrel for compressed air or $CO_2$ rifles and a barrel for compressed air or $CO_2$ rifles obtained. The examples mentioned here do not limit this invention, which may have various applications and adaptations, all of which are within the scope of the following claims.

The invention claimed is:

1. A process for the manufacture of a barrel for a compressed air or CO2 rifle, the barrel comprising a core, the core comprising a hollow tube for discharging a pellet and, optionally, a profile having an interior part that exteriorly wraps around and is in contact with the hollow tube, the hollow tube having an entrance end and an exit end, the process comprising the steps of:
   (a) introducing the core into a molding machine;
   (b) supporting said core with a plurality of fixing elements to dispose the core in an overhanging, centered, stable configuration inside the molding machine, each fixing element having a proximal end that abuts the core;
   (c) over-molding the core with an over-molding fluid, except for the hollow tube entrance end, to define an over-molding having a desired form; and
   (d) retracting the fixing elements from the over-molding, leaving a plurality of orifices in the over-molding defined by said fixing elements, each orifice extending from an outer surface of the over-molding to the core.

2. The process of claim 1, wherein the over-molding fluid enters by at least one of the hollow tube exit end or entrance end.

3. The process of claim 1, wherein the over-molding fluid enters by both the hollow tube exit end and entrance end.

4. The process of claim 1, wherein the hollow tube comprises a plurality of non-slip grooves on an outer surface of the hollow tube in contact with an inner portion of the profile, said non-slip grooves operative to immobilize the profile relative to the hollow tube during the over-molding step.

5. The process of claim 4, wherein the profile comprises a plurality of longitudinal support ribs in contact with the non-slip grooves.

6. The process of claim 1, further comprising a sound reducer permanently fixed to the hollow tube exit end and over-molded by the over-molding process.

7. The process of claim 1, wherein the plurality of fixing elements and orifices defined thereby are disposed in at least four locations radially around the core and in at least two locations longitudinally along the barrel.

8. The process of claim 7, wherein the four locations radially around the core are each in a different cross-sectional radial quadrant from one another, and the two locations longitudinally include a first location adjacent the exit end and a second location distal of the entrance end.

9. The process of claim 1, wherein each of the fixing elements has a tapered geometry.

10. The process of claim 9, wherein each of the fixing elements tapers distally and has an angled, truncated distal end having a face tangential to the core.

11. The process of claim 10, wherein each of the fixing elements is disposed at a non-radial angle relative to the core.

12. A barrel for a compressed air or CO2 rifle, the barrel comprising a the barrel comprising a core, the core comprising a hollow tube for discharging a pellet and, optionally, a profile having an interior part that exteriorly wraps around and is in contact with the hollow tube, the hollow tube having an entrance end and an exit end, the barrel comprising a product manufactured by a process comprising the steps of:
   (a) introducing the core into a molding machine;
   (b) supporting the core with a plurality of fixing elements to dispose the core in an overhanging, centered, stable configuration inside the molding machine, each fixing element having a proximal end in contact with the core;
   (c) over-molding the core with an over-molding fluid, except for the hollow tube entrance end, to define an over-molding having a desired form; and
   (d) retracting the fixing elements from the over-molding, the barrel manufactured thereby comprising an over-molding having a uniform thickness and a plurality of orifices in the over-molding defined by said retracted fixing elements, each orifice extending from an exterior surface of the over-molding to the core.

13. The barrel of claim 12, wherein the profile comprises an extruded aluminum profile.

14. The barrel of claim 13, wherein the profile comprises longitudinal support ribs in contact with the hollow tube.

15. The barrel of claim 12, wherein the hollow tube comprises non-slip grooves in contact with profile.

16. The barrel of claim 15, wherein the profile has a plurality of longitudinal support ribs in contact with the non-slip grooves.

17. The barrel of claim 12, further comprising an sound reducer permanently fixed to the hollow tube exit end and covered by the over-molding.

18. The barrel of claim 12, wherein the over-molding covers at least a part of the profile and a part of the hollow tube.

19. The barrel of claim 12, wherein the plurality of orifices are disposed in at least four locations radially around the core and in at least two locations longitudinally along the barrel.

20. The barrel of claim 19, wherein the four locations radially around the core are each in a different cross-sectional radial quadrant from one another, and the two locations longitudinally include a first location adjacent the exit end and a second location distal of the entrance end.

21. The barrel of claim 12, wherein each of the orifices has a tapered geometry.

22. The barrel of claim 21, wherein each of the orifices is larger at the outer surface of the over-molding than at the core.

23. The barrel of claim 12, wherein each of the orifices extends in a non-radial angle through the over-molding.

* * * * *